(12) United States Patent
Wu et al.

(10) Patent No.: US 10,321,100 B2
(45) Date of Patent: Jun. 11, 2019

(54) SYSTEM AND METHOD OF FOREGROUND EXTRACTION FOR DIGITAL CAMERAS

(71) Applicant: Honeywell International Inc., Morristown, NJ (US)

(72) Inventors: Vic Wu, Shenzhen (CN); Tian Feng Zhao, Shenzhen (CN); Haidong Xu, Shenzhen (CN)

(73) Assignee: ADEMCO INC., Golden Valley, MN (US)

( * ) Notice: Subject to any disclaimer, the term of this patent is extended or adjusted under 35 U.S.C. 154(b) by 258 days.

(21) Appl. No.: 14/558,013

(22) Filed: Dec. 2, 2014

(65) Prior Publication Data
US 2016/0156879 A1    Jun. 2, 2016

(51) Int. Cl.
| | | |
|---|---|---|
| *H04N 7/18* | (2006.01) | |
| *G06T 7/70* | (2017.01) | |
| *G06T 7/11* | (2017.01) | |
| *G06T 7/174* | (2017.01) | |
| *G06T 7/246* | (2017.01) | |
| *G06T 7/254* | (2017.01) | |
| *G06T 7/90* | (2017.01) | |
| *G06T 7/194* | (2017.01) | |

(52) U.S. Cl.
CPC ............... *H04N 7/183* (2013.01); *G06T 7/11* (2017.01); *G06T 7/174* (2017.01); *G06T 7/194* (2017.01); *G06T 7/248* (2017.01); *G06T 7/254* (2017.01); *G06T 7/70* (2017.01); *G06T 7/90* (2017.01); *G06T 2207/10024* (2013.01); *G06T 2207/10048* (2013.01); *G06T 2207/30196* (2013.01); *G06T 2207/30232* (2013.01)

(58) Field of Classification Search
CPC ................................ G06T 7/004; H04N 7/183
USPC .......................................................... 348/51
See application file for complete search history.

(56) References Cited

U.S. PATENT DOCUMENTS

| | | | | |
|---|---|---|---|---|
| 5,151,609 A | * | 9/1992 | Nakagawa | G01B 11/24 250/201.7 |
| 6,754,370 B1 | * | 6/2004 | Hall-Holt | G01B 11/25 356/3 |
| 2004/0146203 A1 | * | 7/2004 | Yoshimura | G08B 13/187 382/218 |

(Continued)

FOREIGN PATENT DOCUMENTS

| | | | | |
|---|---|---|---|---|
| EP | 1 689 172 A1 | | 8/2006 | |
| GB | 2506903 A | * | 4/2014 | A61N 5/1049 |

OTHER PUBLICATIONS

Extended European search report for corresponding EP patent application 15195747.9, dated Mar. 14, 2016.

(Continued)

*Primary Examiner* — Jonathan R Messmore
(74) *Attorney, Agent, or Firm* — Husch Blackwell LLP (57) ABSTRACT

A system and method of foreground objection extraction in connection with detection of single color objects in video frames. A laser emitter in combination with a random, textual pattern producing element illuminates a field of view thereby producing a background frame. The pattern is projected onto single color objects in the field of view. A current frame is compared to one of the background frame, or a prior frame to determine if there are any differences. Responsive to any detected differences, foreground objects are extracted from the current frame, without shadows, light spots or reflections.

8 Claims, 6 Drawing Sheets

Foreground extraction result (56) References Cited

U.S. PATENT DOCUMENTS

| | | | |
|---|---|---|---|
| 2004/0256541 A1* | 12/2004 | Cofer | F16P 3/14 |
| | | | 250/221 |
| 2014/0307056 A1 | 10/2014 | Collet Romea et al. | |
| 2015/0092051 A1* | 4/2015 | Furukawa | G06T 7/20 |
| | | | 348/143 |
| 2015/0265852 A1* | 9/2015 | Meir | A61N 5/1049 |
| | | | 600/1 |

OTHER PUBLICATIONS

Stommel et al., Inpainting of Missing Values in the Kinect Sensor's Depth Maps Based on Background Estimates, IEEE Sensors Journal, Apr. 1, 2014, pp. 1107-1116, vol. 14, No. 4.

\* cited by examiner

FIG. 6A
Background image

FIG. 6C
Foreground extraction result

FIG. 6B
Target object with shadow

FIG. 7A

FIG. 7B ns and methods of foreground extraction for digital cameras

SYSTEM AND METHOD OF FOREGROUND EXTRACTION FOR DIGITAL CAMERAS

FIELD

The application pertains to systems and methods of foreground object extraction in connection with motion detection of objects in video frames. More particularly, the application pertains to such systems and methods wherein texture patterns are projected onto surfaces of objects in a video frame from a surveillance camera to facilitate the foreground object detection.

BACKGROUND

Systems are known to process video from digital survalence cameras to automatically detect motion. Current video motion detection algorithms are often based on foreground extraction techniques.

A background image is usually maintained to compare with the incoming video frames. The foreground object then can be obtained by subtracting a frame by the background image.

Differentiation between adjacent frames can also be used. However, such methods have disadvantages. Shadows, or light spots are often be detected as the foreground objects, because they exhibit obvious differences from the background image. Reflections from glossy surfaces exhibit the same types of problems as they would also change the value of respective pixels in frame.

Many efforts have been devoted to solving these problems. Attempted solutions try to detect changes of texture patterns between a selected video frame and the background image since shadows and light spots only change the overall luminance of the objects, but don't change the patterns on the surface of the objects. Such methods work acceptably with objects having abundant texture patterns. However, they still have problems with single colored objects such as a white wall.

BRIEF DESCRIPTION OF THE DRAWINGS

FIG. 7 B illustrates results of foreground extraction from the image of FIG. 7A.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

In one aspect, embodiments hereof project texture patterns onto the surface of single colored objects using a set of optical elements. With the projected texture patterns, foreground objects can be discriminated from shadows and, or, light spots where a difference is detected between a video frame and a background image.

In another aspect, an apparatus which implements the above process includes, an infrared (IR) projector that can project patterns onto the objects in a field of view (FOV). The apparatus further includes an IR camera that can capture the image of objects in the FOV, and a rigid frame made of rigid material. The frame supports the projector and the camera so that they face the same direction, and keeps them fixed relative to each other. Analysis circuitry coupled to the camera can analyze the received image.

Figure 1:
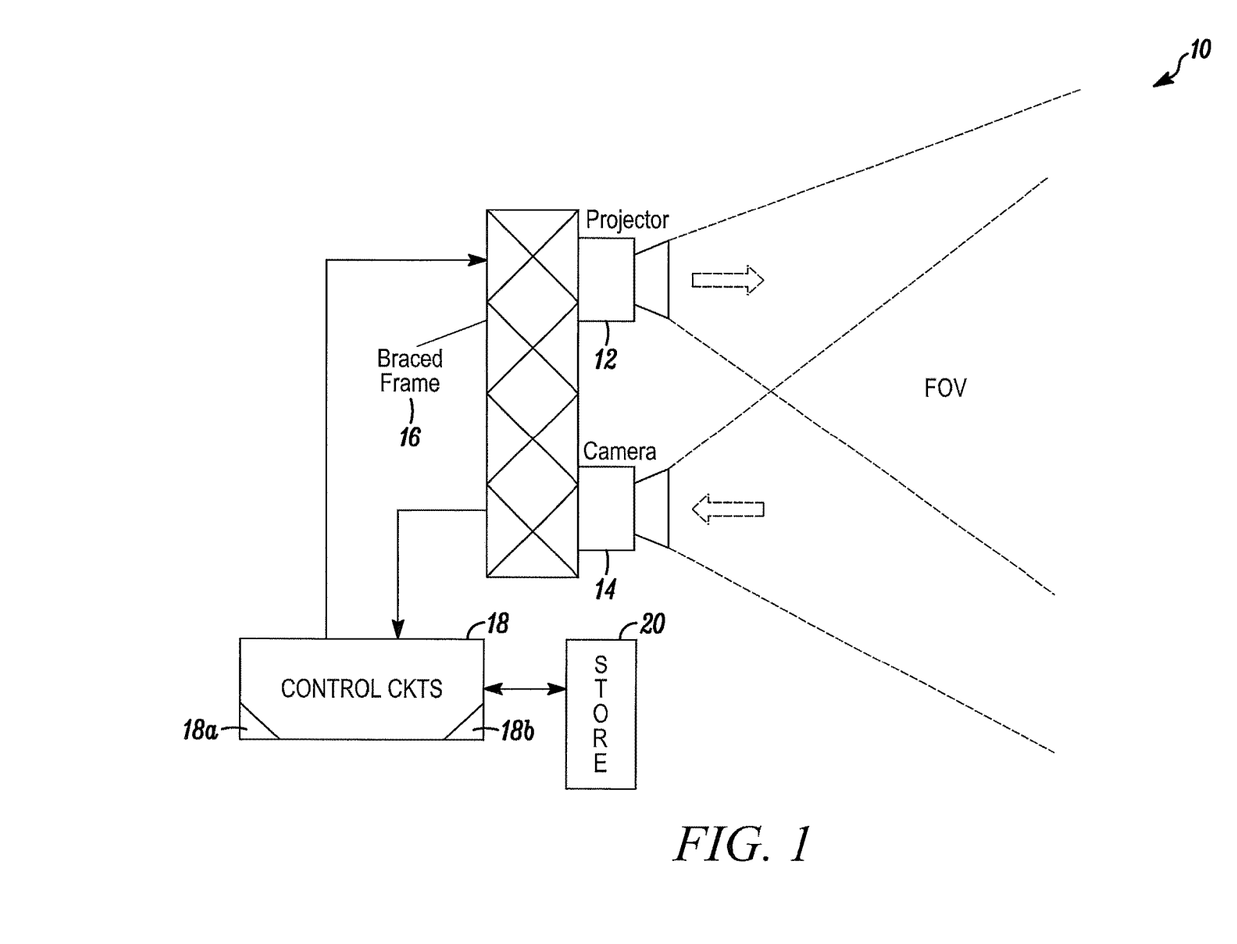
FIG. 1 illustrates a block diagram of a system in accordance herewith.

FIG. 1 illustrates a system 10 in accordance herewith. System 10 includes a projector 12, and a camera 14. A rigid frame 16 carries both the projector 12 and camera 14. The projector 12 and frame 14 are oriented toward a common field of view, FOV.

Analysis and comparison circuits 18 can be coupled to the camera 14, and optionally to the projector 12. As would be understood by those of skill, the analysis circuits could implement pattern recognition processing to compare images from camera 14 to respective, one or more pre-stored background images, or a prior image as discussed below.

Such circuits can be implemented, at least in part, with one or more programmed processors 18a, and associated executable control software 18b and can be coupled to a storage element 20. One or more background images, or images from the FOV can be stored in the element 20 for use by the analysis software.

Figure 2:
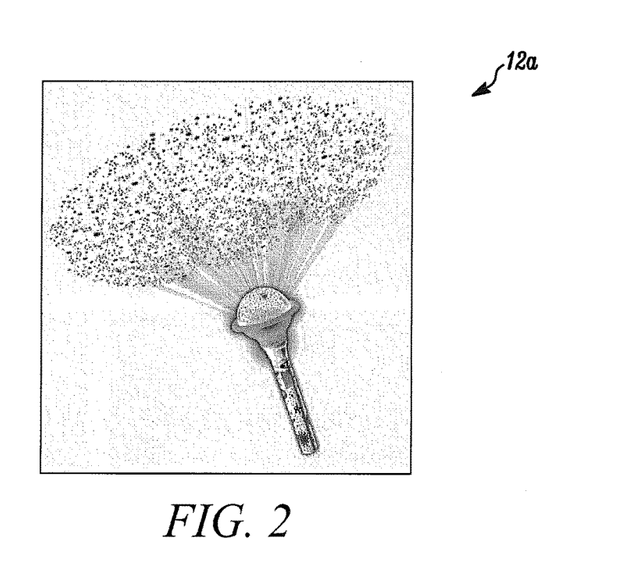
FIG. 2 illustrates an exemplary transmitter.

FIG. 2 illustrates an exemplary projector 12a. The projector 12a includes a housing with an infrared emitting LED. The output end of the LED is covered with a film that carries a randomly distributed pattern. Emitted infrared which passes through the film is projected onto a FOV.

Figure 3:
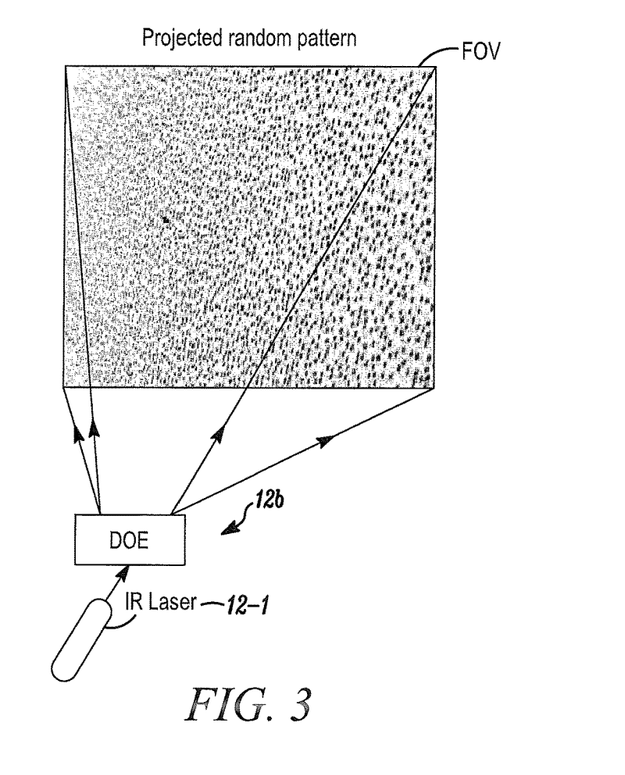
FIG. 3 illustrates an exemplary projector usable in the system of FIG. 1.

FIG. 3 illustrates an alternate exemplary projector 12b. Projector 12b includes an infrared laser 12-1 and an optical diffusion element, 12-2. Output from the element 12-2, a randomly distributed pattern, is projected onto the FOV. It will be understood that a variety of projectors can be used without departing from the spirit and scope hereof. Advantageously, when there is a shadow or light spot in the FOV, the luminance on the surface of the object will decrease or increase, but the pattern on the surface won't change. Further, when there is a reflection from a glossy surface, the image on the glossy surface would be the reflected image of the target object overlaid by the projected pattern. Because the contrast of the projected pattern is very high, it is still possible to discriminate the reflection from a moving object. Finally, when there is a real object in the FOV, which might be moving, the position of the pattern projected on the object would shift a little. Because the pattern is highly randomly designed, the shifted pattern would have no similarity with the original one. So we know that is a real foreground object.

In summary, the present apparatus, and method provides an ability to extract foreground objects from a background using relatively simple and inexpensive circuitry. Multiple units, such as unit 10, in the same room will not interfere with one another.

Figure 4:
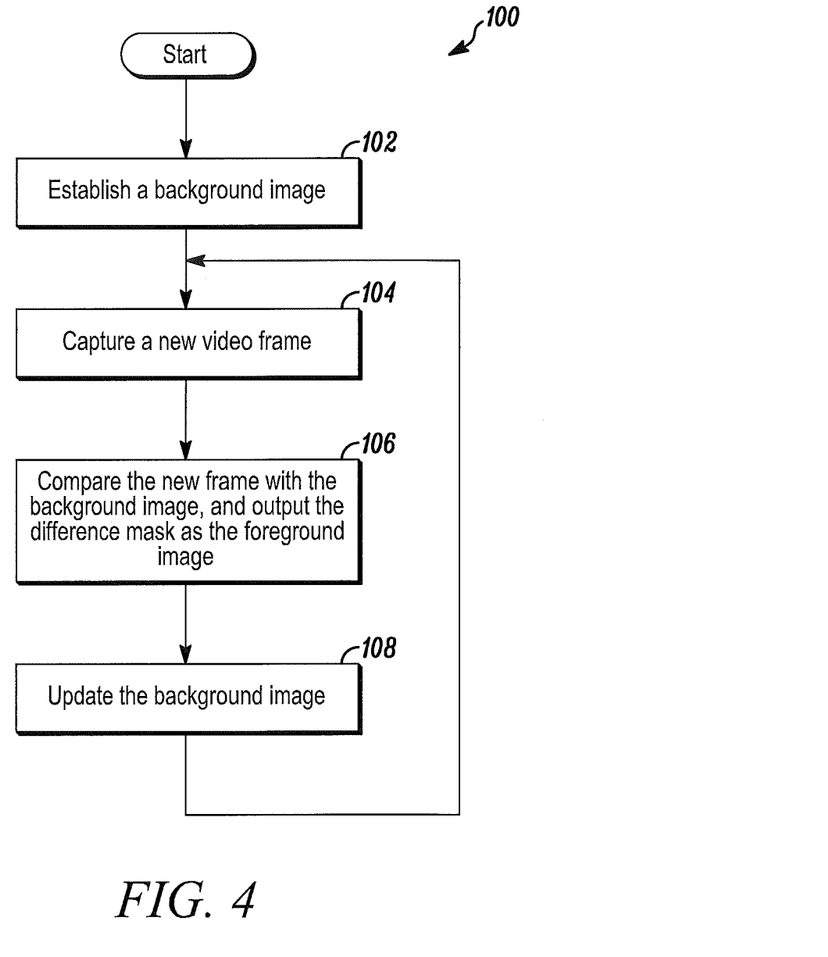
FIG. 4 is a flow diagram of a process implementable by the system of FIG. 1.

FIG. 4 illustrates aspects of a process 100 which can be implemented by the system 10. A background image can be established, and stored, as at 102. A new video frame, illuminated by the random pattern emitted by transmitter 12, can be captured from the camera 14, as at 104.

The newly captured frame can be compared with the background image, and the results of that comparison, a difference mask, can be output as the foreground image, as at 106. The background image can then be updated, as at 108.

Figure 5:
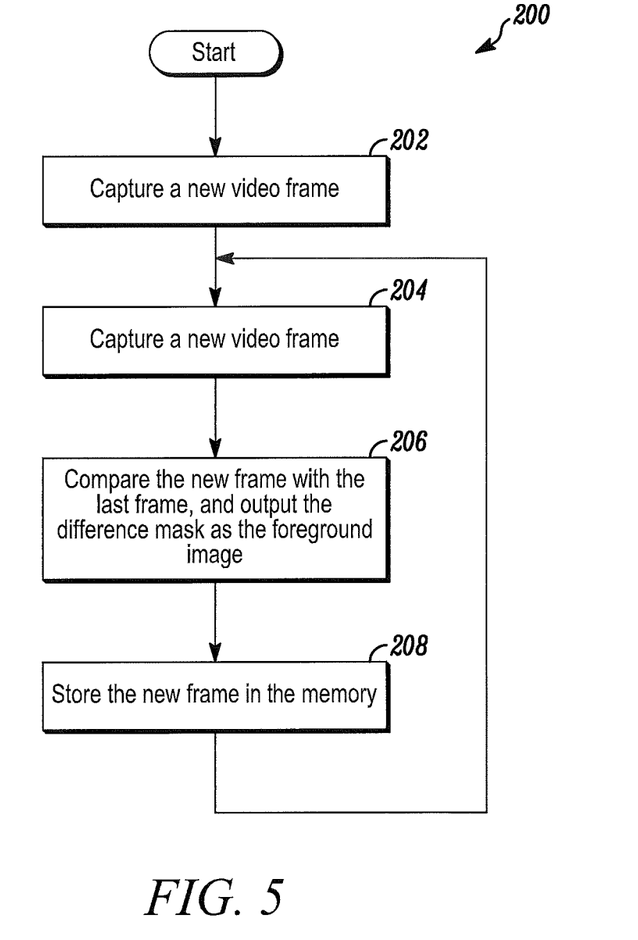
FIG. 5 is a flow diagram of an alternate process implementable by the system of FIG. 1.

FIG. 5 illustrates aspects of an alternate process 200. A new video frame can be captured as at 202. A second, new, frame can be captured as at 204.

The new frame is then compared with the last frame, and the difference mask output as the foreground image as at 206. The new frame can be stored in the element 18, as at 208. The sequence can then be repeated.

Figure 6A:
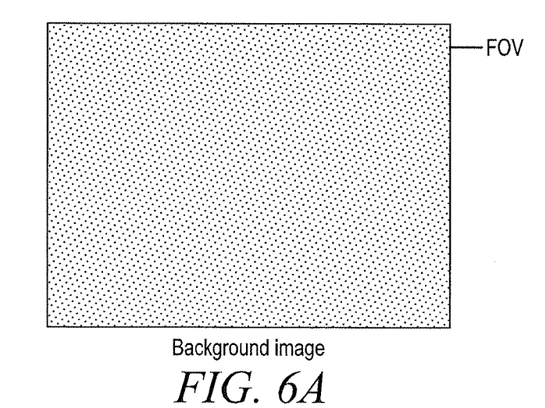
FIG. 6A illustrates a background image in a field of view.
Figure 6B:
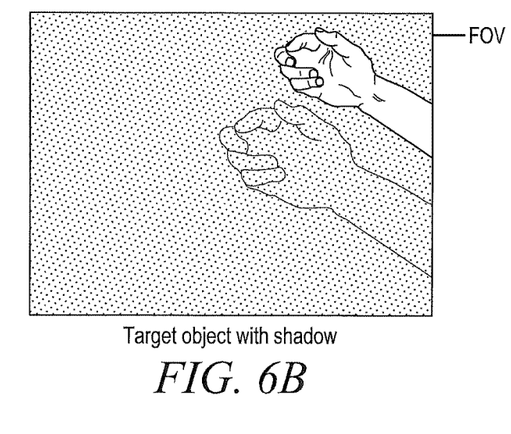
FIG. 6B illustrates a target object with a shadow in the file of view.
Figure 6C:
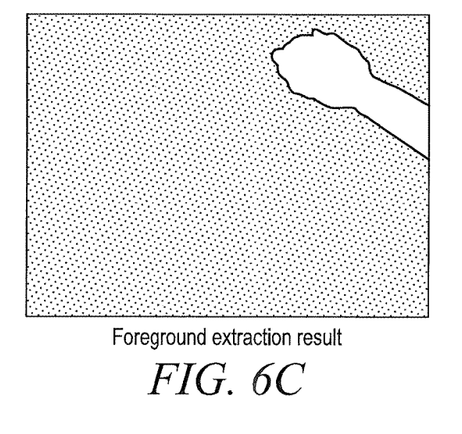
FIG. 6C illustrates results of foreground extraction from the image of FIG. 6B.

FIGS. 6A-C illustrate outputs from the system 10 and aspects of an exemplary processing scenario. In FIG. 6A a pre-stored background frame, or background image is illustrated.

FIG. 6B illustrates a target object, a hand and wrist that are present in the field of view, along with a shadow. The above described laser and optical diffusion element, such as laser 12-1, and optical diffusion element 12-2 project the random textual pattern 12-3 into the FOV. After processing as described above, a foreground extraction result is illustrated in FIG. 6C.

Figure 7A:
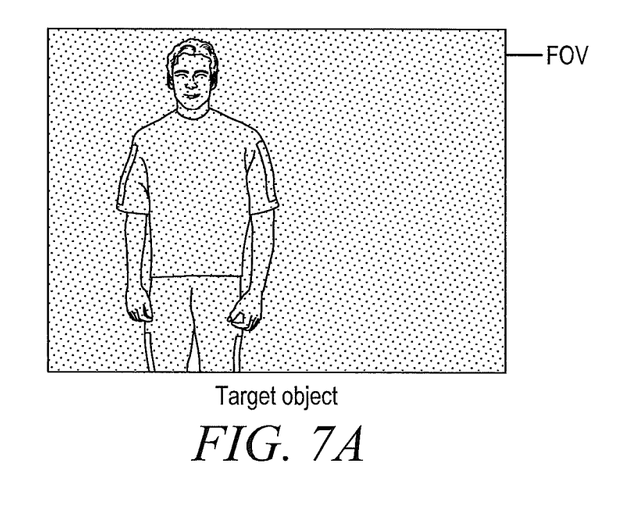
FIG. 7A illustrates another target object in the field of view.
Figure 7B:
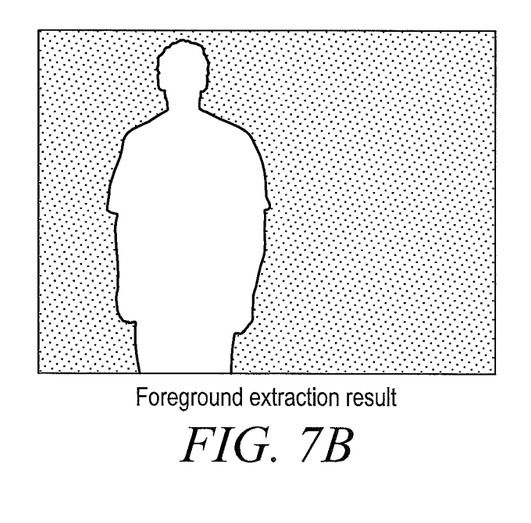

With respect to the same background frame as in FIG. 6A, FIG. 7A, illustrates a possibly moving target object in the FOV. FIG. 7B illustrates a foreground extraction result in accordance herewith. In FIG. 7A, the projected pattern shifts to the left on the surface of the object, relative to the background frame as in FIG. 6A.

In summary, system 10 can eliminate shadows, light spots or reflections from glossy surfaces in the field of view. When a real, single color, object enters the field of view, the position of the pattern projected on the object shift somewhat. Because the pattern is intentionally randomized, the shifted pattern would be different form the original pattern. This indicates that there is a real object in the foreground. This information can be forwarded to an operator at a security, or video, monitoring station.

Further, the present system and method of foreground objection extraction in connection with detection of single color objects in video frames takes advantage of random texture patterns. A laser emitter in combination with a random, textual pattern producing element illuminates a field of view thereby producing a background frame. The pattern is projected onto single color objects in the field of view.

A current frame is compared to one of the background frame, or a prior frame to determine if there are any differences. Responsive to any detected differences, foreground objects are extracted from the current frame, without shadows, light spots or reflections.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A method comprising:
   establishing a field of view;
   projecting a high contrast textured image into the field of view;
   identifying and storing at least one of a background frame and a current frame of the field of view;
   detecting and storing a subsequent frame of the field of view;
   comparing the high contrast textured image in the at least one of the background frame and the current frame to the high contrast textured image in the subsequent frame to generate a difference mask identifying portions in the subsequent frame where there is a shift in a position of the high contrast textured image relative to the at least one of the background frame and the current frame that is caused by a single color object in the field of view; and
   extracting the difference mask as a foreground image from the subsequent frame,
   wherein the high contrast textured image includes a randomly distributed pattern, and
   wherein a combination of a high contrast in and the randomly distributed pattern of the high contrast textured image and generating the difference mask allows for discrimination of the foreground image from shadows, light spots, and reflections in the subsequent frame.

2. The method as in claim 1 further comprising using the foreground image to establish an alarm condition.

3. The method as in claim 2 further comprising modulating a beam of a selected frequency in infrared light emitted from a LED to project the high contrast textured image into the field of view.

4. The method as in claim 3 further comprising:
   coupling a transmitter to a rigid frame to project the high contrast textured image into the field of view; and
   coupling a receiver to the rigid frame to receive the subsequent frame and the at least one of the background frame and the current frame.

5. The method as in claim 4 further comprising orienting the rigid frame so the transmitter and the receiver are oriented toward the field of view.

6. An apparatus comprising:
   a transmitter for projecting a high contrast textured infrared pattern into a field of view;
   a sensor of infrared light that captures first images of the field of view that contain the high contrast textured infrared pattern;
   control circuits coupled at least to the sensor; and
   a storage element coupled to the control circuits for storing the first images,
   wherein the control circuits compare a current frame received at the sensor to at least one of the stored images,
   wherein the control circuits generate a difference mask identifying portions in the current frame where there is a shift in a position of the high contrast textured infrared pattern relative to the one of the stored images that is caused by a single color object in the field of view,
   wherein the control circuits extract the difference mask as a surface image from the current frame,
   wherein the high contrast textured infrared pattern includes a randomly distributed pattern, and
   wherein a combination of a high contrast in and the randomly distributed pattern of the high contrast textured infrared pattern and generating the difference mask allows for discrimination of the surface image from shadows, light spots, and reflections in the current frame.

7. The apparatus as in claim 6 wherein the transmitter includes a laser source.

8. The apparatus as in claim 6 wherein the control circuits include pattern recognition circuitry.

* * * * *